(12) United States Patent
Leuck

(10) Patent No.: US 12,088,243 B2
(45) Date of Patent: Sep. 10, 2024

(54) STACKABLE AND SLIDABLE SOLAR PANEL ARRAYS

(71) Applicant: Solxx Systems LLC, Gretna, NE (US)

(72) Inventor: Dale Leuck, Gretna, NE (US)

(73) Assignee: SOLXX SYSTEMS LLC, Gretna, NE (US)

( * ) Notice: Subject to any disclaimer, the term of this patent is extended or adjusted under 35 U.S.C. 154(b) by 0 days.

(21) Appl. No.: 17/686,155

(22) Filed: Mar. 3, 2022

(65) Prior Publication Data
US 2022/0286083 A1    Sep. 8, 2022

Related U.S. Application Data

(60) Provisional application No. 63/156,173, filed on Mar. 3, 2021.

(51) Int. Cl.
| | |
|---|---|
| H02S 30/20 | (2014.01) |
| C02F 1/00 | (2023.01) |
| H02S 40/38 | (2014.01) |
| H04W 88/08 | (2009.01) |

(52) U.S. Cl.
CPC .............. *H02S 30/20* (2014.12); *C02F 1/00* (2013.01); *H02S 40/38* (2014.12); *C02F 2201/009* (2013.01); *H04W 88/08* (2013.01)

(58) Field of Classification Search
CPC ...................................... H02S 30/20
See application file for complete search history.

(56) References Cited

U.S. PATENT DOCUMENTS

| | | | | |
|---|---|---|---|---|
| 3,627,585 | A * | 12/1971 | Dollery | H02S 30/20 244/172.6 |
| 4,452,234 | A * | 6/1984 | Withjack | F24S 25/70 136/246 |
| 5,244,508 | A * | 9/1993 | Colozza | B64G 1/222 136/292 |
| 5,969,501 | A * | 10/1999 | Glidden | H02S 20/30 320/136 |
| 2004/0124711 | A1* | 7/2004 | Muchow | F24S 25/10 307/64 |
| 2007/0243025 | A1* | 10/2007 | Ronnkvist | E02D 5/801 405/244 |
| 2010/0000592 | A1* | 1/2010 | Ko | H02S 20/00 136/246 |
| 2010/0156339 | A1* | 6/2010 | Hoffman | H02S 10/40 320/101 |
| 2011/0132353 | A1* | 6/2011 | Gumm | H02S 20/30 29/890.033 |
| 2011/0146751 | A1* | 6/2011 | McGuire | F03D 9/007 136/245 |
| 2011/0253614 | A1* | 10/2011 | Curran | H02S 30/20 136/245 |

(Continued)

*Primary Examiner* — Sadie White
(74) *Attorney, Agent, or Firm* — Suiter Swantz IP

(57) ABSTRACT

A solar panel array system is disclosed. The system comprises a base structure, a slider assembly, one or more hinges, one or more stands, a primary set of solar panels coupled to a primary set of slider panels slidably extendable and slidably retractable along a first direction, a secondary set of solar panels coupled to a secondary set of slider panels slidably extendable and slidably retractable along a second direction opposite from the first direction, and telescoping legs.

8 Claims, 7 Drawing Sheets

(56) References Cited

U.S. PATENT DOCUMENTS

2012/0031488 A1* 2/2012 Kaufman ............... H02S 20/00
  136/259
2016/0352285 A1* 12/2016 Seery ..................... H02S 30/20
2018/0238305 A1* 8/2018 McMahon ............. F03D 9/007

* cited by examiner

STACKABLE AND SLIDABLE SOLAR PANEL ARRAYS

CROSS-REFERENCE TO RELATED APPLICATION

The present application claims the benefit under 35 U.S.C. § 119(e) of U.S. Provisional Application Ser. No. 63/156,173, filed Mar. 3, 2021, entitled STACKABLE AND SLIDABLE SOLAR PANEL ARRAYS, naming Dale Leuck as an inventor, which is incorporated herein by reference in the entirety.

BACKGROUND

The deployment of solar energy is rapidly increasing in all sectors of the global economy, including the residential, commercial, industrial, and agricultural sectors. Although the price of photovoltaic solar cells continues to decrease, the deployment of solar panel systems is slow and cumbersome. Solar panel systems designed for residential or commercial rooftops cannot be easily deployed in remote locations such as farm fields or deserts. Additionally, such solar panel systems cannot be quickly deployed in times of emergency during which conventional power generations fail, such as during hurricanes, earthquakes, blizzards, etc. Thus, it is desirable to design a solar panel array system that advantageously solves the above problems.

SUMMARY

A solar panel array system is disclosed in accordance with one or more embodiments of the present invention. In some embodiments, the system comprises a base structure; a slider assembly; one or more hinges coupled to the base structure and the slider assembly, wherein the one or more hinges are configured to pivot the slider assembly at angle with respect to the base structure; one or more stands configured to hold the slider assembly; a primary set of solar panels coupled to a primary set of slider panels, wherein the primary set of solar panels and the primary set of slider panels are slidably extendable and slidably retractable along a first direction; a secondary set of solar panels coupled to a secondary set of slider panels, wherein the secondary set of solar panels and the secondary set of slider panels is slidably extendable and slidably retractable along a second direction opposite from the first direction; outer telescoping legs coupled to the base structure, wherein the outer telescoping legs have first holes therein; and inner telescoping legs having second holes therein, wherein the inner telescoping legs are configured to slide in and out of the outer telescoping legs.

A method of deploying a solar panel array apparatus is disclosed in accordance with one or more embodiments of the present disclosure. In one illustrative embodiment, the method comprises extending a primary set of solar panels and a primary set of slider panels along a first direction, and extending a secondary set of solar panels and a secondary set of slider panels along a second direction opposite from the first direction.

It is contemplated that the solar panel array system provided to a customer within a day of order within a possible range of 500 miles of a hub. Advantageously, the solar panel array system may be operational within a matter of a few hours at a site in order to provide energy in a quick, effective manner.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
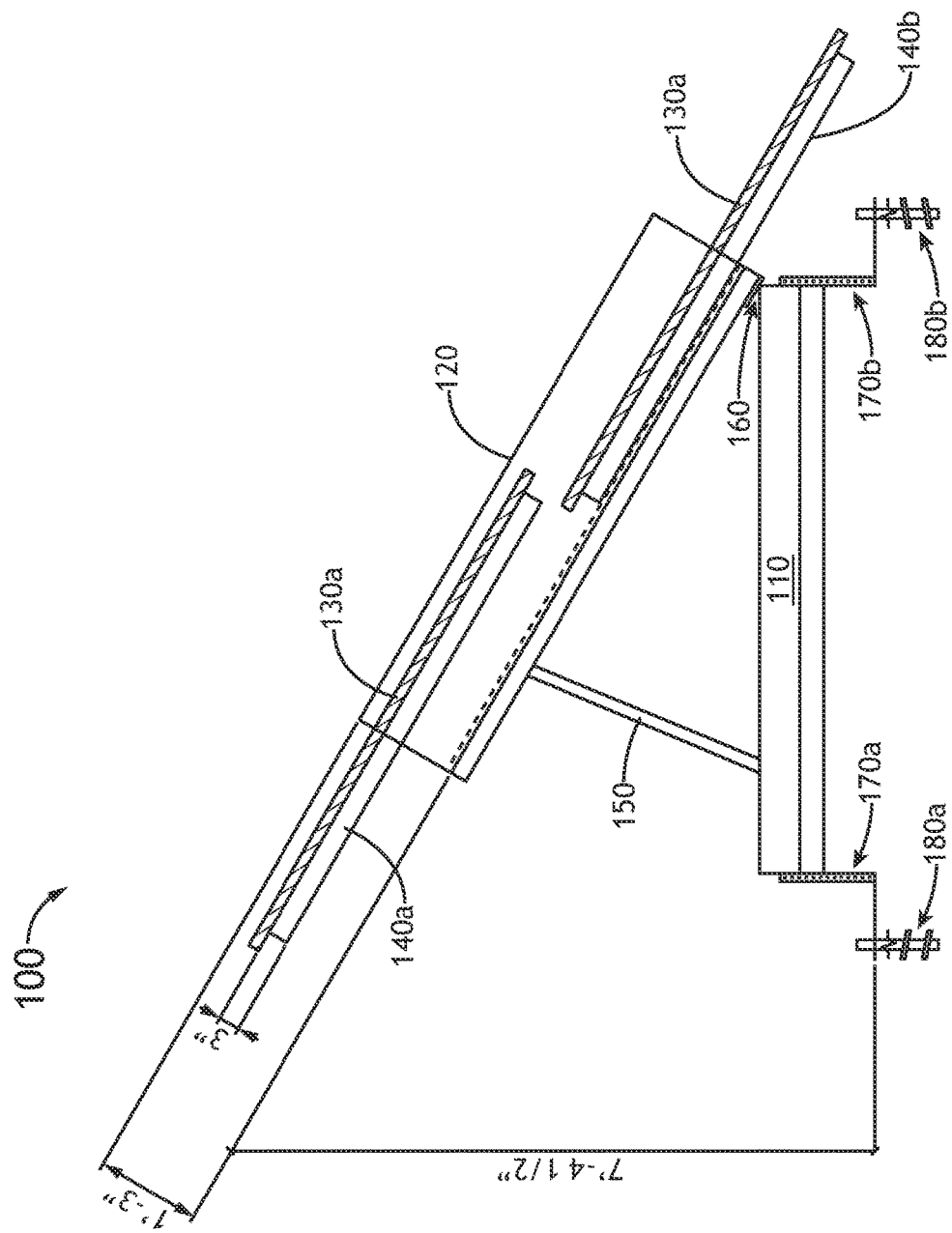
FIG. 1 is a diagram view of a solar panel array system, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Embodiments of the present disclosure are directed to a portable, stackable, ground-mounted solar array system that is simple to manufacture and deploy. FIG. 1 is a diagram view of a solar panel array system 100, in accordance with one or more embodiments of the present disclosure. The solar panel array system 100 may include a base structure 110, a slider assembly 120, a primary set of solar panels 130a, a secondary set of solar panels 130b, a primary set of slider panels 140a, a secondary set of slider panels 140b, one or more stands 150, one or more hinges 160, outer telescoping legs 170a and 170b, and one or more helical anchors 180 and 180b. The solar panel array system may be formed as a prefabricated device, primarily assembled in a factory, and may be deployed to a location. The solar panel array system may be portable, first through the ability to be stackable (e.g., can be stacked on a trailer and transported) and delivered on a truck, and then may be portable within a location with use of optional wheels or a trailer.

The base structure 110 may act as a foundation for the solar panel array system 100. The base structure 110 may be attached, secured, or connected to other components of the solar panel array system 100 using welding, screws, nuts, bolts, etc. The base structure 110 may comprise a structural steel such as ASTM A36 (e.g., for strength and durability), although the present disclosure is not limited thereto. It is contemplated that the structural steel may be galvanized to advantageously provide a 20-year lifespan free from any oxidation. In some embodiments, the base structure has a weight from 200 to 400 pounds, although the present disclosure is not limited thereto.

The slider assembly 120 may be mechanically coupled to the base structure 110 using one or more hinges 160. The one or more hinges 160 may pivot the slider assembly 120 at an angle with respect to the base structure 110 (for example, at an angle of from 10° to 80° with respect to the base structure 110). In some embodiments, the slider assembly 120 may be raised using a jack device (e.g., hydraulically-cranked, electrically-cranked or hand-cranked), and the one or more stands 150 may hold the slider assembly 120 at the angle. In some embodiments, the one or more stands 150 are adjustable to accommodate different angles of the slider assembly 120 with respect to the base structure 110. For example, the one or more stands 150 may be configured to hold the slider assembly 120 at 10°, 20°, 30°, etc. This may allow for more optimal energy production based on the month of the year and a normal day's trajectory of the sun.

The sets of solar panels 130a and 130b may comprise any type of photovoltaic (PV) solar module device. The solar panels 130a and 130b may use sunlight (photons) as a source of energy to generate direct current electricity (i.e., the photovoltaic effect). In some embodiments, the solar panel array system 100 may have an energy conversion efficiency of about 21.5% and power density values of about 175 W/m². In some embodiments, the solar panel array system 100 may output between 4 kW and 4.5 kW at peak solar flux and may produce between 6300 to 7100 kW-h per year. In some embodiments, each set of solar panels 130a and 130b may include 5 solar panels each for a total of 10 solar panels in the array system 100, although the present disclosure is not limited thereto. For example, in some embodiments, the array system 100 may comprise 2 solar panels, 6 solar panels, 14 solar panels, etc.

The primary set of solar panels 130a may be connected or secured to the primary set of slider panels 140a. The primary set of solar panels 130a and the primary set of slider panels 140a may be slidably extendable and slidably retractable along a first direction. The primary set of slider panels 140a may be coupled to a primary set of rollers configured to roll along the first direction within a primary set of grooves in the slider assembly 120. Stoppers may be disposed at the ends of the primary set of grooves to stop the primary set of rollers from rolling outside the grooves.

The secondary set of solar panels 130b may be connected or secured to the secondary set of slider panels 140b. The secondary set of solar panels 130b and the secondary set of slider panels 140b may be slidably extendable and slidably retractable along a second direction opposite from the first direction. The secondary set of slider panels 140b may be coupled to a secondary set of rollers configured to roll along the second direction within a secondary set of grooves in the slider assembly 120. Stoppers may be disposed at the ends of the secondary set of grooves to stop the secondary set of rollers from rolling outside the grooves.

It is noted herein that the solar panels 130a may not be limited to extend in the first direction. For example, in some embodiments, the solar panels 130a may be configured to extend in the second direction. Likewise, in some embodiments, the solar panels 130b may be configured to extend in the first direction. However, it may be advantageous to configure the stoppers in the grooves of the slider assembly 120 such that the solar panels 130a extend only along the first direction and the solar panels 130b extend only along the second direction. In this way, the solar panels 130a and 130b do not overlap and a maximum amount of power may be generated.

In some embodiments, a tertiary set of solar panels (not shown) may be configured to be stationary (e.g., not extendable or retractable) between the primary set of solar panels 130a when the panels 130a are fully extended and the secondary set of solar panels 130b when the panels 130b are fully extended. In this way, the primary, secondary, and tertiary panels may not overlap each other. In some embodiments, the tertiary set of solar panels is extendable or retractable in the first direction or the second direction (e.g., using slider panels, rollers, and grooves in the slider assembly 120). It is contemplated that the sets of solar panels may be slid from a stored position to a use position through use of a motorized device, potentially battery powered, to assist in the setup or transport of the solar panel array system 100.

In some embodiments, the outer telescoping legs 170a and 170b may be coupled to the base structure 110. One or more inner telescoping legs 175a and 175b (shown in FIG. 5) may be configured to slide in and out of the outer telescoping legs 170a and 170b. The outer telescoping legs 170a and 170b may have first holes therein configured to receive one or more bolts. The inner telescoping legs 175a and 175b may have second holes therein configured to receive the one or more bolts. In this way, the inner telescoping legs 175a and 175b may be coupled to the outer telescoping legs 170a and 170b using the one or more bolts fastened with one or more nuts, and the solar panel array system 100 may be adjustably raised and lowered over the ground. It is contemplated that any type of fastener may be employed to secure the outer telescoping leg with the inner telescoping leg without departing from the scope and intent of the present disclosure.

In some embodiments, the helical anchors 180a and 180b may have a helical or spiral structure and may be configured to fasten the solar panel array system 100 to the ground (e.g., in dirt, soil, clay, sand, etc.). In some embodiments, the helical anchors 180a and 180b may comprise hot-dip galvanized finished ASTM 153 that is resistant to rust. The helical anchors 180a-b may prevent the solar panel array system 100 from tipping over from wind. For example, the helical anchors 180a-b may stop winds to about 120 mph from tipping the solar panel array system 100.

In some embodiments, solar panel array system 100 may further include a set of wheels, rear wheels, front wheels, or both, in addition to, or instead of the helical anchors 180a-b. The wheels may increase the portability of the solar panel array system 100 which may be helpful in scenarios where electrical power is needed for different purposes at different locations. For example, on a grain farm, the solar panel array system 100 may be used for powering electrical pumps for irrigation in the summer, and, using the wheels, may be moved to a grain silo for powering heaters in the winter.

Figure 2:
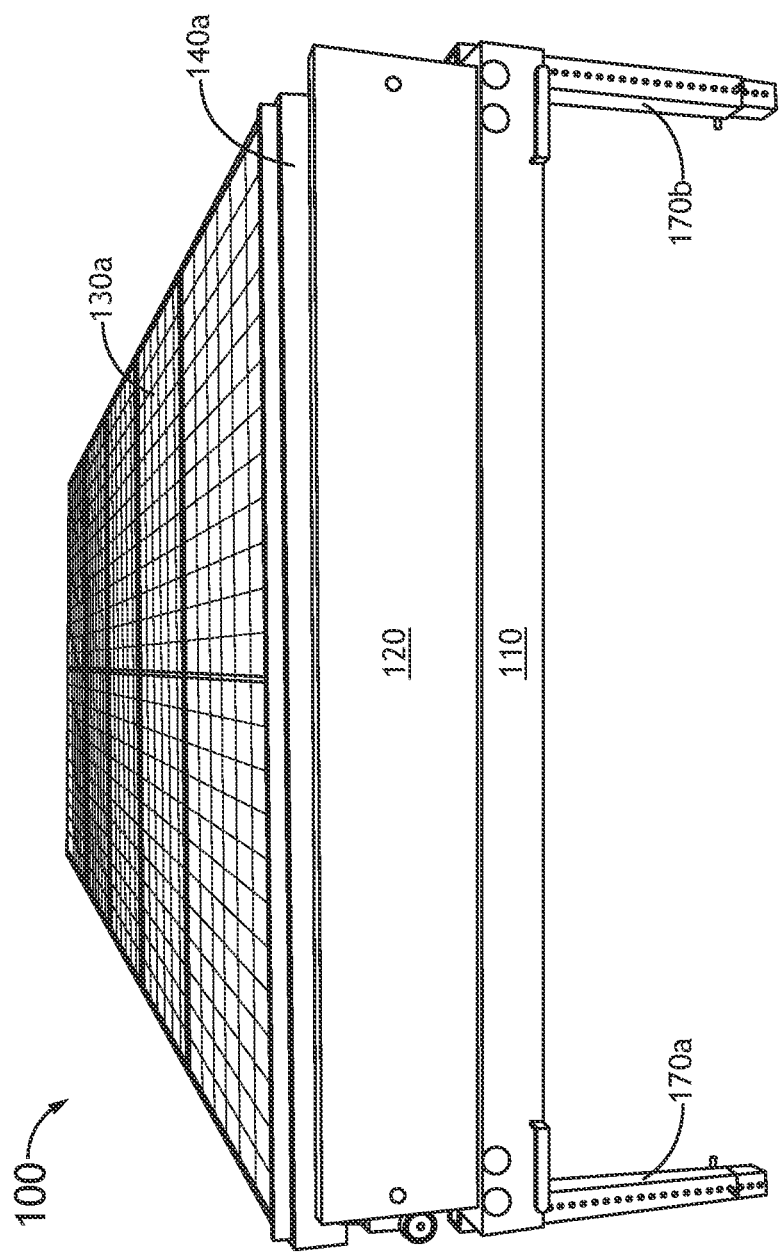
FIG. 2 is a perspective view of a solar panel array system with the solar panels in a retracted position, in accordance with one or more embodiments of the present disclosure.
Figure 3:
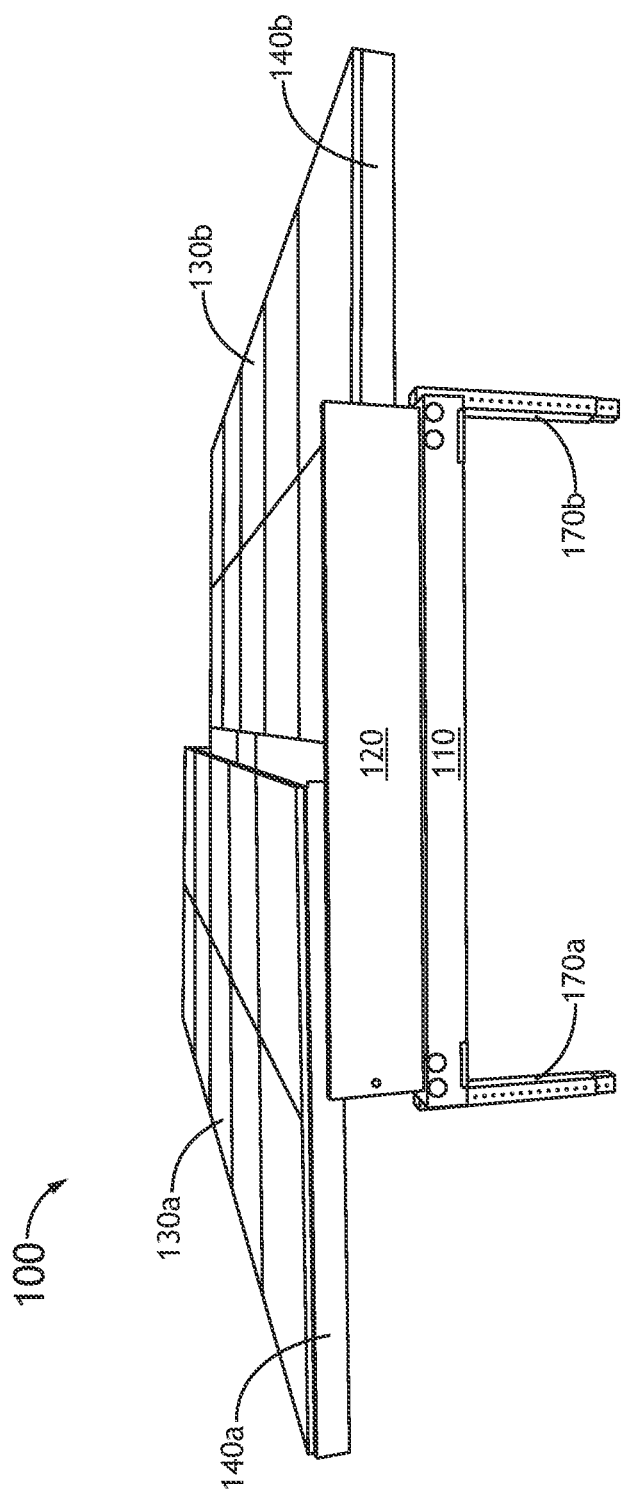
FIG. 3 is a perspective view of a solar panel array system with the solar panels in an extended position, in accordance with one or more embodiments of the present disclosure.
Figure 4:
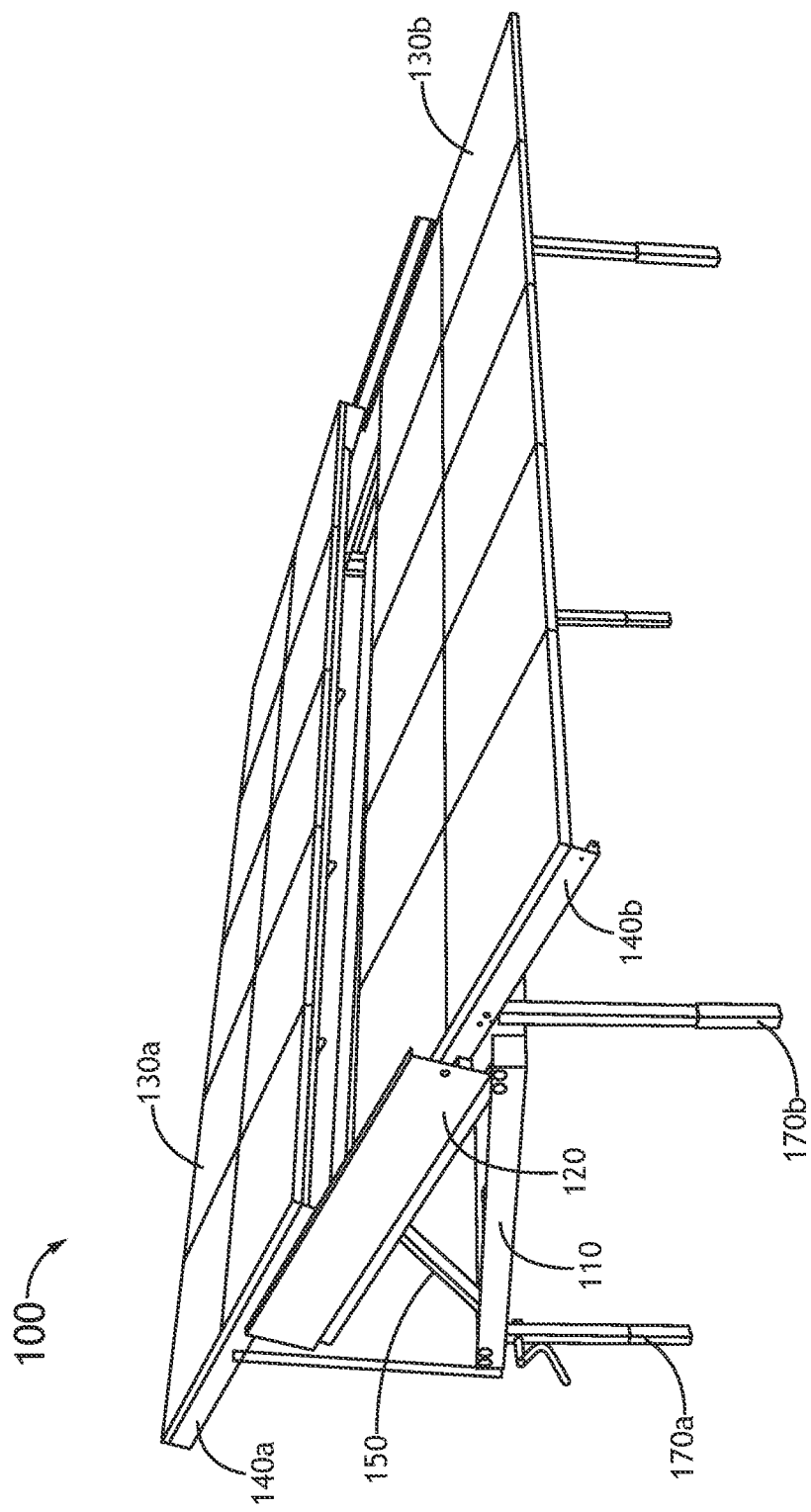
FIG. 4 is a perspective view of a solar panel array system with the solar panels in an extended position and held at an angle, in accordance with one or more embodiments of the present disclosure.

FIG. 2 shows the solar panel array system 100 with the solar panels 130a and 130b in a fully retracted state. The system 100 may have a rectangular form and may be stackable with other systems 100 (e.g., to be placed on a truck, train, shipping container, etc.). FIG. 3 shows the solar panel array system 100 with the solar panels 130a and 130b in a fully extended state. As shown, the solar panels 130a and 130b do not overlap with each other which enables maximum power generation. FIG. 4 shows the solar panel array system 100 with the solar panels 130a and 130b in the fully extended state, and with the sliding assembly 120 at an angle with respect to the base structure 110.

Figure 5:
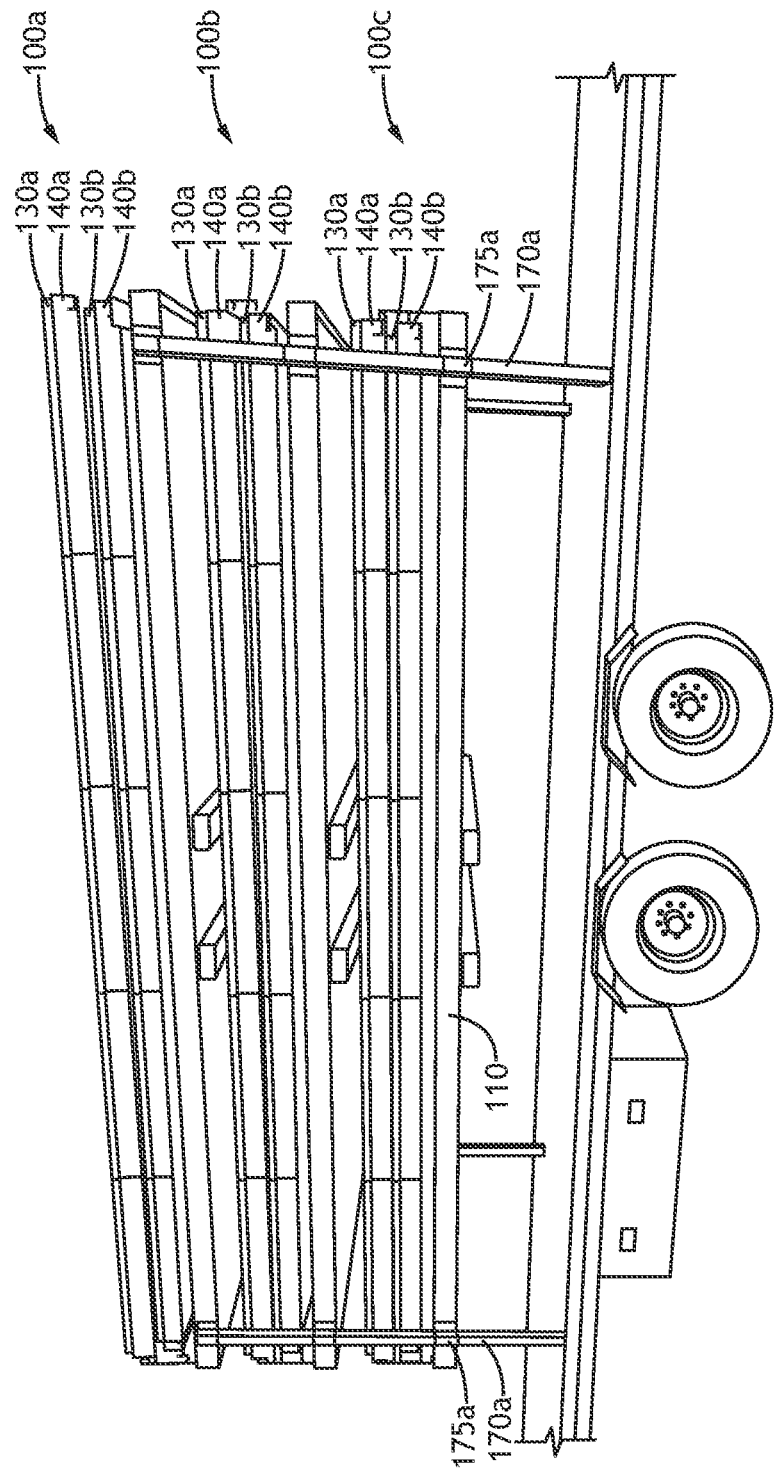
FIG. 5 is a perspective view of multiple stacked solar panel array systems, in accordance with one or more embodiments of the present disclosure.

As shown in FIG. 5, in some embodiments, multiple solar panel array systems 100a-c may be stacked on top of each other using the outer telescoping legs 170a and 170b and the inner telescoping legs 175a and 175b. The ability to transport multiple solar panel array systems 100, possibly up to 15, on a flatbed trailer towed by a pick-up or truck is highly advantageous as it reduces the cost for green energy to a consumer. Each of the solar panel array systems 100 may be coupled to the others of the solar panel array systems 100 by attaching or securing the inner telescoping legs 175a and 175b to the outer telescoping legs 170a and 170b using one or more bolts aligned with the first holes and the second holes and fastened with one or more nuts. It is contemplated that a pick-up and trailer with a 5th wheel connection device may deliver up to 10 units. A semitruck and a long flatbed trailer may allow transportation of up to 15 units. It is further contemplated that the solar panel array system can be shipped within a 40-foot shipping container.

In some embodiments, the solar panel array system 100 may include a battery. The battery may be configured to store power when the solar panel array system 100 is not directly powering an electrical device. In some embodiments, if the solar panel array system 100 is connected to an electrical grid, the battery may draw excess power in the case of an overproduction of renewable energy. Likewise, in the case of an underproduction of renewable energy, the battery may provide power to the electrical grid.

In some embodiments, the solar panel array system 100 may include electrical devices for use in an emergency situation involving a power blackout (e.g., a hurricane, an earthquake, a snow storm, a tornado, etc.). In such a configuration, the device may be deployed by FEMA of the United States Federal Government to provide power and water during an emergency situation.

Figure 6:
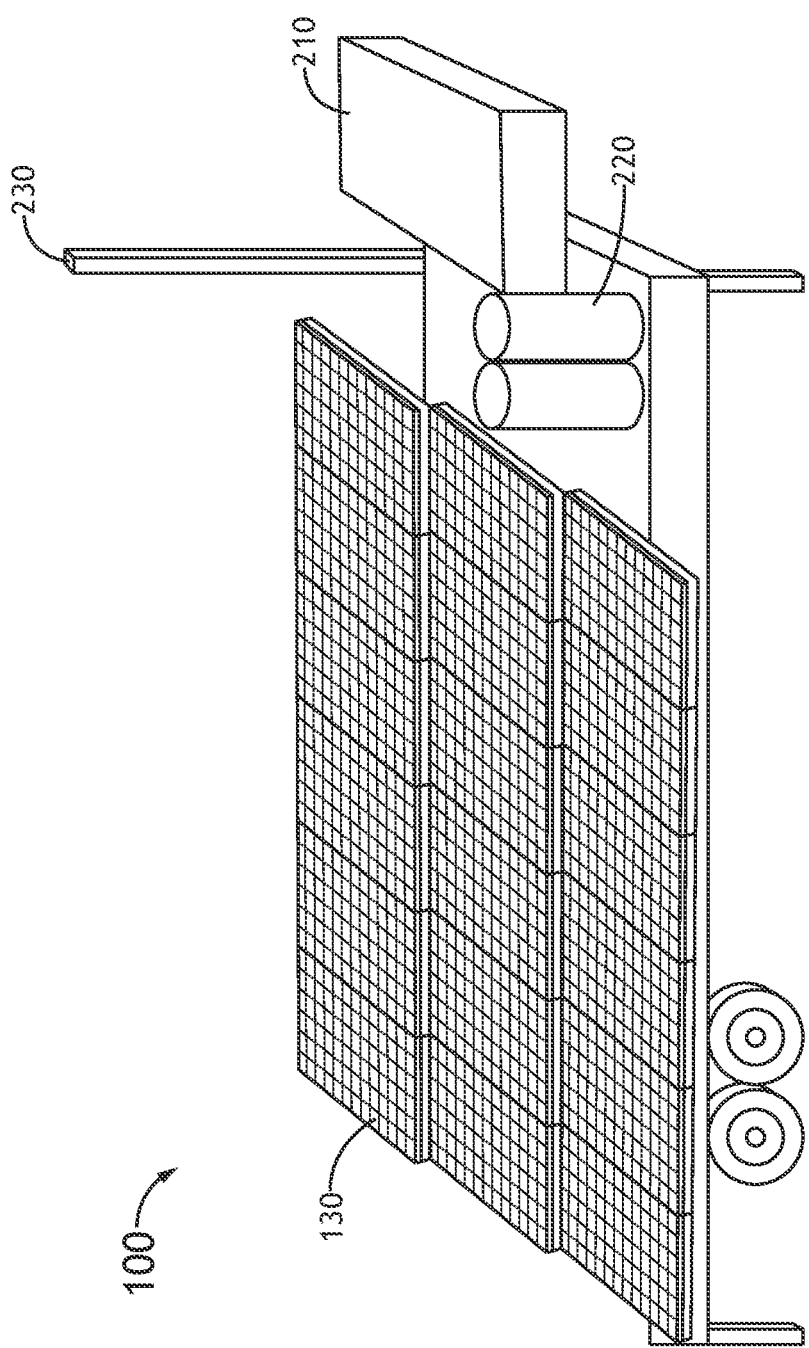
FIG. 6 is a perspective view of a solar panel array system employed as an emergency situation device including a battery, water purification device, and a cell tower, in accordance with one or more embodiments of the present disclosure.

Referring to FIG. 6, the solar panel array system 100 employed as an emergency situation device is connected to a battery 210, a water purification device 220, and a cell tower 230, in accordance with one or more embodiments of the present disclosure, is shown. For example, the solar panel array system 100 may be connected to a portable cellphone tower 230 (e.g., a rapid deployment unit [RDU], cell-on-wheels, microcell, etc.) and a water purification system 220 (including a water boiler and/or filter). In this way, the solar panels 130a and 130b and/or the battery 210 may power the emergency electrical devices in the absence of power from the electrical grid, and may provide communications for lost family members and clean drinking water for thirsty evacuees.

Figure 7:
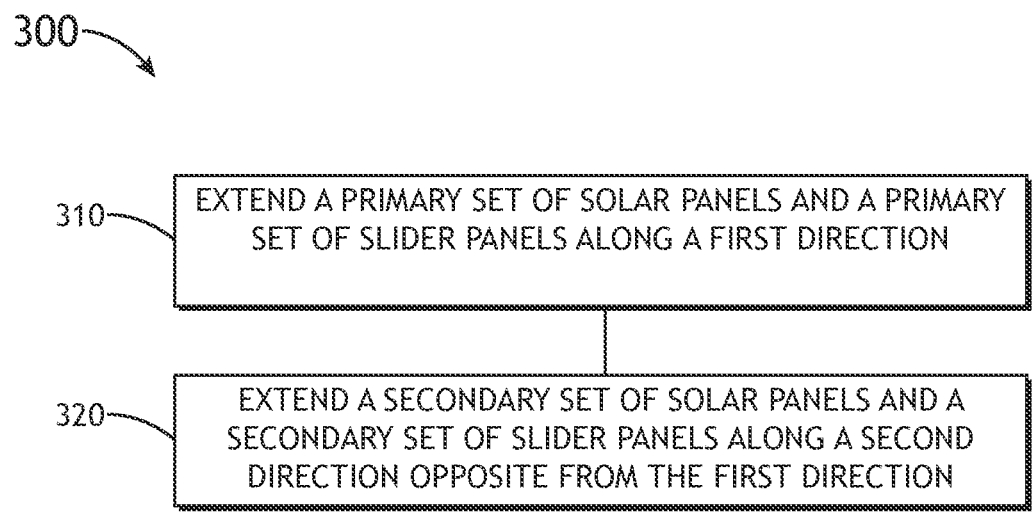
FIG. 7 is a flowchart illustrating a method of deploying a solar panel array apparatus, in accordance with one or more embodiments of the present disclosure.

FIG. 7 shows a method 300 of deploying a solar panel array apparatus. The solar panel array apparatus may be substantially similar or substantially identical to the system 100 described with respect to FIGS. 1-4. At 310, a primary set of solar panels and a primary set of slider panels are extended along a first direction. At 320, a secondary set of solar panels and a secondary set of slider panels is extended along a second direction opposite from the first direction.

The solar panel array system 100 provides a number of advantages. The ability to assemble the system in a factory and deliver it to a location reduces installation from a few days to a few minutes. It is contemplated that the solar panel array system 100 may be stored in large quantities in a hub arrangement, whereby each hub would be ready to serve a geographical area of a radius of 500 miles from the hub. The solar panel array system 100 may include wiring harnesses and electrical connections whereby the only remaining installation may include a connection to an electrical switching station. This further reduces the cost for the consumer. Additionally, the ability to develop a distribution system across the United States may allow a delivery system to provide a solar panel array system within one or two days.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A solar panel array system, comprising:
   a base structure;

a slider assembly;

one or more hinges, each hinge of the one or more hinges coupled to the base structure at a first side of the base structure and the slider assembly at a first side of the slider assembly, wherein the one or more hinges pivot the slider assembly at an angle with respect to the base structure;

one or more stands, each stand of the one or more stands coupled to the base structure at a second side of the base structure and to the slider assembly at a second side of the slider assembly;

a primary set of solar panels coupled to a primary set of slider panels, wherein the primary set of solar panels and the primary set of slider panels are slidably extendable and slidably retractable along a first direction;

a secondary set of solar panels coupled to a secondary set of slider panels, wherein the secondary set of solar panels and the secondary set of slider panels is slidably extendable and slidably retractable along a second direction opposite from the first direction;

outer telescoping legs coupled to the base structure at a top side of the outer telescoping legs, the outer telescoping legs include first holes, the outer telescoping legs extend below the base structure;

inner telescoping legs configured to slide in and out of the outer telescoping legs, the inner telescoping legs include second holes, wherein a first inner telescoping leg of the inner telescoping legs fastens to a first outer telescoping leg of the outer telescoping legs via a fastener, the inner telescoping legs extending below the outer telescoping legs.

2. The solar panel array system of claim 1, wherein the angle of the slider assembly is adjustable from 10° to 80° with respect to the base structure.

3. The solar panel system of claim 1, wherein:

the primary set of slider panels are coupled to a primary set of rollers configured to roll along the first direction within a primary set of grooves in the slider assembly, and the secondary set of slider panels are coupled to a secondary set of rollers configured to roll along the second direction within a secondary set of grooves in the slider assembly.

4. The solar panel system of claim 1, comprising helical anchors configured to fasten the solar panel array system to ground.

5. The solar panel system of claim 1, further comprising a battery on the base structure, wherein the primary set of solar panels and the secondary set of solar panels are connected to the battery.

6. The solar panel array system of claim 1, further comprising a water purification device on the base structure, wherein the primary set of solar panels and the secondary set of solar panels are connected to the water purification device.

7. The solar panel array system of claim 1, further comprising a cell tower coupled to the base structure, wherein the primary set of solar panels and the secondary set of solar panels are connected to a cell tower.

8. A solar panel array system, comprising:

a base structure;

a slider assembly;

one or more hinges, each hinge of the one or more hinges coupled to the base structure at a first side of the base structure and the slider assembly at a first side of the slider assembly, wherein the one or more hinges pivot the slider assembly at an angle with respect to the base structure;

one or more stands, each stand of the one or more stands coupled to the base structure at a second side of the base structure and to the slider assembly at a second side of the slider assembly;

a primary set of solar panels coupled to a primary set of slider panels, wherein the primary set of solar panels and the primary set of slider panels are slidably extendable and slidably retractable along a first direction;

a secondary set of solar panels coupled to a secondary set of slider panels, wherein the secondary set of solar panels and the secondary set of slider panels is slidably extendable and slidably retractable along a second direction opposite from the first direction;

outer telescoping legs coupled to the base structure at a top side of the outer telescoping legs, the outer telescoping legs include first holes, the outer telescoping legs extend below the base structure; and inner telescoping legs configured to slide in and out of the outer telescoping legs, the inner telescoping legs include second holes, wherein a first inner telescoping leg of the inner telescoping legs fastens to a first outer telescoping leg of the outer telescoping legs via a fastener, the first inner telescoping leg fastens to another outer telescoping leg of another solar panel array via another fastener when the another solar panel array is stacked on the solar panel array for transport.

* * * * *